United States Patent [19]

Von Blücher et al.

[11] Patent Number: 4,978,460
[45] Date of Patent: Dec. 18, 1990

[54] AQUEOUS SWOLLEN MACROMOLECULE-CONTAINING SYSTEM AS WATER FOR FIREFIGHTING

[76] Inventors: Hubert Von Blücher, Freytagstrasse 45; Hasso Von Blücher, Columbusstrasse 58, both of D-4000 Düsseldorf; Ernest De Ruiter, Höhenstrasse 57a, D-5090 Leverkusen 3, all of Fed. Rep. of Germany

[21] Appl. No.: 193,438

[22] Filed: May 12, 1988

Related U.S. Application Data

[63] Continuation-in-part of Ser. No. 855,196, Apr. 23, 1986.

[30] Foreign Application Priority Data

May 3, 1985 [DE] Fed. Rep. of Germany ....... 3515865
May 15, 1987 [DE] Fed. Rep. of Germany ....... 3716304

[51] Int. Cl.$^5$ ...................... A62D 1/00; C09K 21/14; C09K 21/00
[52] U.S. Cl. .......................................... 252/2; 252/8; 252/601; 252/610; 252/611; 169/DIG. 2; 169/5; 523/179; 106/203; 260/998.12
[58] Field of Search ............... 252/609, 610, 611, 601, 252/2, 6.5, 8.05, 363.5; 169/46, 47, 45, 5, DIG. 2; 8/115.6, 490; 106/18.11, 203; 524/558; 428/920-921; 523/179; 260/998.12

[56] References Cited

U.S. PATENT DOCUMENTS

| 3,080,316 | 3/1963 | Petertyl et al. | 252/2 |
| 3,666,707 | 5/1972 | Livingston | 252/2 |
| 3,684,707 | 8/1972 | Livingston | 252/2 |
| 4,145,296 | 3/1979 | Fox et al. | 106/15.05 |
| 4,179,367 | 12/1979 | Barthell et al. | 210/41 |
| 4,338,239 | 7/1982 | Dammann | 524/549 |
| 4,351,754 | 9/1982 | Dupré | 524/445 |
| 4,384,988 | 5/1983 | Schoenholz et al. | 252/610 |
| 4,402,364 | 9/1983 | Klein | 169/47 |
| 4,442,018 | 4/1984 | Rand | 252/307 |
| 4,624,320 | 11/1986 | Romaine | 169/50 |
| 4,652,589 | 3/1987 | Simroth et al. | 521/137 |

FOREIGN PATENT DOCUMENTS 133392 10/1981 Japan ................... 252/601

Primary Examiner—Howard J. Locker
Attorney, Agent, or Firm—Sprung Horn Kramer & Woods

[57] ABSTRACT

In a particulate additive for water for fire fighting containing a strongly swelling water-insoluble high molecular weight polymer as gelatinizing agent, the improvement which comprises a water-soluble release agent which does not cause the particles of said gelatinizing agent to swell, the particles of the gelatinizing agent being encased or dispersed in the release agent. Suitable release agents include polyethylene glycol, diammonium biphosphate, sugars, mannitol, etc. The gelatinizing agent may be a moderately cross-linked water-insoluble acrylic or methacrylic acid copolymer.

7 Claims, No Drawings

AQUEOUS SWOLLEN MACROMOLECULE-CONTAINING SYSTEM AS WATER FOR FIREFIGHTING

This is a continuation-in-part of application Ser. No. 855,196, filed Apr. 23, 1986, now pending, the disclosure of which is incorporated herein by reference.

The present invention relates to an additive for water for fire fighting containing a strongly swelling water-insoluble high molecular weight polymer as gelatinizing agent.

High molecular weight polymer substances of the kind which are added to the water for fire fighting as swelling agents are described in application Ser. No. 855,196, supra. These substances are highly absorptive and can absorb in a short time about 100- to 200-fold of their weight of water without, however, being dissolved in water. These substances are then present in the form of gel particles that are highly swollen due to hydration and are dispersed in the water for fire fighting. If one adds to the so-swollen gel particles an excess of water, the latter will remain as pure aqueous phase. The viscosity of the water for fire fighting after adding the gelatinizing agent is only slightly higher than the viscosity of pure water. The sufficiently low viscosity is important in order that the water for fire fighting remains easy to handle, in particular fully pumpable. The advantages of the water for fire fighting to which an additive of the indicated kind is added are a reduction of the amount of water necessary for fire fighting, a reduction of the fire extinguishing time as well as the reduction of the water for fire fighting which runs off from the source of fire.

In spite of its excellent fire extinguishing effect, when the swelling high molecular weight polymeric gelantinizing substance is added to the water for fire fighting, lumps may be formed.

In the Mediterranean countries sometimes seawater serves as water for fighting forest fires. The sodium chloride present therein leads, analogous to hardness-causing salts, to a disturbance of the swelling procedure. Swelling times of from one to several minutes are necessary to swell the gelatinizing substance. When water for fire fighting from a triple combination pumper is used, in which the substances have enough time to swell, the swelling times play only a subordinate role; however, it is extremely difficult to disperse lumps once they are formed.

Therefore, an object of the present invention is to improve an additive for water for fire fighting of the above-mentioned kind so that the disadvantages described above no longer occur.

In accordance with the invention, the additive particles of gelatinizing agent for water for fire fighting are encased by, or dispersed in, a water-soluble release agent of the kind that does not cause the particles of the gelatinizing agent to swell. The release agent protects the gelatinizing agent from becoming sticky upon the penetration of water and thus from agglutinating. When using the release agent according to the invention, the dispersing of the gelatinizing substance takes place without any problem.

It is important that the release agent has a good water solubility and does not itself cause the particles of the gelatinizing agent to swell.

According to the invention, the release agent functions as a barrier between the particles of the gelatinizing agent and, therefore, prevents agglutination. Since the prior art gelatinizing substances require a swelling time of from one to several minutes, the use of water for fire fighting containing additives of the indicated kind in the case of large-scale fires would necessitate the storage of the water for fire fighting in intermediate containers in order to achieve the necessary swelling time. The use of intermediate containers would become superfluous if it were possible to reduce the swelling time to a few seconds. Such a reduction of the swelling time can be basically achieved by reducing the particle size of the particles of the gelatinizing agent. On the one hand, thereby one increases the working surface of the water during the swelling procedure and, on the other hand, reduces the diffusion path. However, using very fine particles of the gelatinizing agent increases the risk of agglutination. If, however, one encases according to the invention the particles of the gelatinizing agent by a water-soluble release agent, even very finely ground gelatinizing substances may be used without any agglutination of the particles. Hence, it is possible by virtue thereof directly to spray the gelatinizing substance into the hose pipe through a nozzle.

Preferred release agents according to the invention are polyalkylene glycols, e.g. polyethylene glycol. In contrast to ethylene glycol and diethylene glycol, polyethylene glycol is not absorbed by the gelatinizing substance. Therefore, a polyethylene glycol layer protects the particles of the gelatinizing agent from sticking to each other too quickly upon the penetration of water and from agglutination. Moreover, polyethylene glycol is absolutely non-toxic and is very quickly decomposed and, therefore, can be considered an ecologically non-polluting substance.

It has proved to be advantageous to wet the particles of the gelatinizing agent with an amount of from 10 to 100% by weight of polyethylene glycol 300 or 400, based on the amount of gelatinizing substance.

In addition, diammonium biphosphate has proved to be a particularly suitable release agent. In fire fighting in the Mediterranean area where the most disastrous forest fires occur, the tanks are often filled with seawater. The sodium chloride present in high concentration therein as well as the hardness-causing salts that are likewise contained therein result in a strong reduction of the swelling capacity of the gelatinizing substance. This disadvantageous effect is considerably reduced when diammonium biphosphate is used as release agent. The phosphate ion blocks the hardness-causing substance and the ammonium ion compensates for the negative effect of the sodium ion on the swelling capacity. It is particularly advantageous to use the diammonium biphosphate in amounts of from 20 to 100% by weight, based on the gelatinizing substance.

A particularly preferred method of preparing the additive for water for fire fighting is to dry mix the gelatinizing substance with, for example, 50% by weight of diammonium biphosphate in a high speed mixer. The diammonium biphosphate crystals are crushed thereby. At the same time, from 10 to 30% by weight of water, based on the gelatinizing substance, are sprayed. The particles of the gelatinizing substance become sticky for a short time and the diammonium biphosphate is permanently fixed on the surface of the particles of the gelatinizing agent.

Sugars are also suitable for use as release agent according to the invention, in particular mono- and disaccharides. Good results were obtained, for example, with sugars and sugar derivatives such as sugar alcohols, e.g. mannitol.

In accordance with the disclosure of application Ser. No. 855,196, supra, suitable additives with which the instant water-soluble release agents are combined are potassium, sodium or ammonium salts of dry slightly cross-linked copolymers of the highly absorptive type, i.e. based on sodium acrylate and/or acrylic acid, the copolymers having a particle size of from 0.02 to 0.5 mm. Suitable cross-linking agents are all olefinic, at least bifunctional monomers, such as, for example, methylene-bis-acrylamide, divinyl benzene, tris-allycyanurate, tris-allyl-phosphate, etc. The preparation of the suitable cross-linked polymers by radical or redox-polymerization is known in the art.

In order to accelerate the swelling procedure, finely divided active silicic acid and/or silicates may be added, if desired, to the non-swollen copolymers. The active silicic acids that may be added are products which are already known, in particular as fillers or absorbers, such as the silicic acid xerogels having surfaces of more than 30 $m^2/g$, measured according to the BET Method, usually several hundred $m^2/g$ or the active silicic acids having surfaces of from 50 to 450 $m^2/g$ (Aerosil), measured according to the BET Method, prepared by flame hydrolytic decomposition of silicon tetrachloride. Instead of the active silicic acids, also active silicates precipitated from water glass and the corresponding metal salts and possibly mineral acids, in particular silicates of calcium, magnesium or aluminum, having surfaces measured according to the BET Method of more than 30 $m^2/g$, in the form of their xerogels, are applicable for the purposes of the invention, in combination with the highly absorptive polymers.

The invention will be further described in the following illustrative examples.

EXAMPLE 1

An easily-wetted partial sodium salt of polyacrylic acid, according to application Ser. No. 855,196, was ground into particles of approximately 0.1–0.3 mm and mixed at a ratio of 3:1 in a high-powered mixer with polyethylene glycol that had a molecular weight of 400. Polyethylene bags were filled with the resulting crumbly material. A triple-combination pumper owned by the Karlsruhe Fire Department was filled with 600 l of water. 1.5 kg of the product was placed in a section of hose about 3 m long. The hose was secured to the intake and outlet connection of the vehicle's centrifugal pump. The contents of the hose were rinsed into the tank in spurts. No lumps formed, and the product was perfectly dispersed. (If the starting material is injected without any additive, a considerable number of lumps form.)

The water so prepared was employed in comparative tests on two identical summerhouses with precisely defined combustible materials placed inside them. The two structures were ignited in exactly the same way. One extinguishing test was carried out with water alone and the other with water with the additive in accordance with the invention. The level of combustion was precisely the same when each extinguishing agent was brought into use.

| Results | Water alone | Water plus invention |
|---|---|---|
| Time elapsed until suppression of flames | 1 minute | 36 seconds |
| Total time elapsed until total extinction | 8 minutes | 5 minutes, 20 seconds |
| Volume of water consumed up to suppression of flames | 35 liters | 21 liters |
| Total volume of water consumed | 81 liters | 35 liters |

Due to its tendency to lump, only granular material (e.g. 0.2–0.4 mm) of the type in application Ser. No. 855,196 could be employed, and it could only be added in small portions. It was impossible to grind the material fine because it started to lump. There are, however, advantages to a fine material. Whereas coarse material takes 1 to 2 minutes to expand, fine material takes only approximately 10 seconds, and it is the only material that will swell rapidly enough to be injected directly into the extinguishing jet. No intermediate tank is necessary. The material without polyethylene glycol forms lumps when injected finely ground.

In another trial, the finely ground material was as we have said mixed (jacketed) at a ratio of 3:1 with polyethylene glycol with a molecular weight of 400 and introduced into the intake end of the firetruck pump with a worm gear. The speed of the worm gear was regulated to introduce 200 g of product into each liter of water. The water emerged from the nozzle after remaining in the hose approximately 10 seconds. The material in accordance with the invention was observed to adhere to even vertical walls. Without adding polyethylene glycol it was impossible to inject finely ground material without lumps forming immediately.

EXAMPLE 2

The other approach, with the additive jacketed with diammonium phosphate, was tested by the Fire Prevention Laboratory with respect to its dispersing capacity in hard water (German hardness 20).

100 kg of the expanding material from application Ser. No. 855,196 were thoroughly mixed in a high-powered capacity of approximately 1000 l. The water was circulated with a fire-department pump. 1 kg of the expanding material jacketed with the DAP was poured very rapidly into the tub. The result was immediate disperson without any lumps. Swelling was complete in 90 seconds. A comparative test with 800 g of swelling material alone led to the formation of several lumps. The difference between the jacketed and the unjacketed swelling material was even more evident when the original water hardness of 11° DH (German hardness) was increased by adding calcium and magnesium salts to more than 20° DH. Whereas the jacketed product, which also dispersed excellently, took approximately 90 seconds to expand even in hard water, the unjacketed product did not disperse as well and took more than 120 seconds to expand.

It will be understood that the specification and examples are illustrative but not limitative of the present invention and that other embodiments within the spirit and scope of the invention will suggest themselves to those skilled in the art.

What is claimed is:

1. In a flowable mass of water for fire fighting containing particles of a strongly swelling water-insoluble high molecular weight polymer as gelatinizing agent, the improvement which comprises a water-soluble release agent which does not cause the particles of said gelatinizing agent to swell, the particles of the gelatinizing agent being encased or dispersed in the release agent, the release agent being selected from the group consisting of, diammonium biphosphate, a sugar or a sugar derivative.

2. An additive for water for fire fighting according to claim 1, wherein the release agent comprises diammonium biphosphate.

3. An additive for water for fire fighting according to claim 2, wherein the diammonium biphosphate is present in about 20 to 100% by weight, based on the gelatinizing agent.

4. An additive for water for fire fighting according to claim 1, wherein the release agent is a sugar or sugar derivative.

5. An additive for water for fire fighting according to claim 4, wherein the release agent is a mono- or disaccharide.

6. An additive for water for fire fighting according to claim 4, wherein the release agent is mannitol.

7. An additive for water for fire fighting according to claim 1, wherein the gelatinizing agent is a moderately cross-linked water-insoluble acrylic or methacrylic acid copolymer.

* * * * *